US010556632B2

(12) United States Patent
Bowker

(10) Patent No.: US 10,556,632 B2
(45) Date of Patent: Feb. 11, 2020

(54) BICYCLE SADDLE

(71) Applicants: PARADIGM INDUSTRIES AUSTRALIA PTY LTD, North Lakes (AU); BASF SE, Ludwigshafen (DE)

(72) Inventor: Craig Bowker, North Lakes (AU)

(73) Assignees: PARADIGM INDUSTRIES AUSTRALIA PTY LTD, North Lakes (AU); BASF SE, Ludwigshafen (DE)

(*) Notice: Subject to any disclaimer, the term of this patent is extended or adjusted under 35 U.S.C. 154(b) by 0 days.

(21) Appl. No.: 16/070,296

(22) PCT Filed: Jan. 20, 2017

(86) PCT No.: PCT/AU2017/050045
§ 371 (c)(1),
(2) Date: Jul. 16, 2018

(87) PCT Pub. No.: WO2017/132722
PCT Pub. Date: Aug. 10, 2017

(65) Prior Publication Data
US 2019/0047648 A1  Feb. 14, 2019

(30) Foreign Application Priority Data
Feb. 2, 2016  (AU) .................. 2016900323

(51) Int. Cl.
*B62J 1/00* (2006.01)
*B62J 1/08* (2006.01)
(52) U.S. Cl.
CPC .............. *B62J 1/007* (2013.01); *B62J 1/005* (2013.01); *B62J 1/08* (2013.01)

(58) Field of Classification Search
None
See application file for complete search history.

(56) References Cited

U.S. PATENT DOCUMENTS 401,123 A   4/1889   Brooks
615,223 A   11/1898  Peck
(Continued)

FOREIGN PATENT DOCUMENTS

CA       1230041 A         12/1987
DE   10 2013 005 383 A1   10/2014
(Continued)

OTHER PUBLICATIONS

Extended European Search Report dated Aug. 28, 2019, in Patent Application No. 17746636.4, 3 pages.

*Primary Examiner* — David E Allred
(74) *Attorney, Agent, or Firm* — Oblon, McClelland, Maier & Neustadt, L.L.P.

(57) ABSTRACT

A bicycle saddle for attaching to a bicycle seat post including a rearward seat portion extending forwardly to a soft compressible nose. The seat portion adapted to support a rider's ischial tuberosities in the cruising position. The nose adapted to support the rider's pudendal or pelvic anatomy. The seat portion having downwardly sloped lateral flanges disposed either side of the nose wherein the flanges continue to provide support to the ischial tuberosities. Any increase in perineal and pudendal pressure is substantially absorbed by the compressibility of the nose such that maintaining continuous contact with the seat portion and nose enables full saddle control as the rider shifts from the cruising to an aerodynamic or racing position.

12 Claims, 4 Drawing Sheets

(56) References Cited

U.S. PATENT DOCUMENTS

| | | | | |
|---|---|---|---|---|
| 6,095,600 A | * | 8/2000 | Mattingly | B62J 1/002 |
| | | | | 297/201 |
| 6,402,236 B1 | * | 6/2002 | Yates | B62J 1/005 |
| | | | | 297/201 |
| 6,609,751 B1 | * | 8/2003 | Angelo | B62J 1/005 |
| | | | | 297/195.1 |
| 6,705,674 B1 | * | 3/2004 | McMahan | B62J 1/00 |
| | | | | 297/195.1 |
| 7,448,676 B2 | | 11/2008 | Wyner et al. | |
| 8,668,259 B2 | | 3/2014 | Ulrich | |
| 8,973,986 B1 | | 3/2015 | Marceleno | |
| 9,039,082 B2 | | 5/2015 | Truglio | |
| D767,909 S | | 10/2016 | Toll | |
| 2004/0113470 A1 | | 6/2004 | Tobias | |
| 2007/0069556 A1 | * | 3/2007 | Bleloch | B62J 1/005 |
| | | | | 297/195.1 |
| 2011/0260510 A1 | * | 10/2011 | Hsu | B62J 1/08 |
| | | | | 297/201 |
| 2014/0375092 A1 | | 12/2014 | Curless | |
| 2015/0251717 A1 | * | 9/2015 | Portz | B62J 1/005 |
| | | | | 297/201 |
| 2019/0270491 A1 | * | 9/2019 | Downing | B62J 1/28 |

FOREIGN PATENT DOCUMENTS

| | | |
|---|---|---|
| DE | 10 2013 013 770 A1 | 2/2015 |
| JP | S62-10189 U | 1/1987 |
| WO | 2012107215 A1 | 8/2012 |

* cited by examiner

BICYCLE SADDLE

FIELD OF THE INVENTION

This invention relates to bicycles, in particular to a bicycle saddle which enables the rider to be comfortably and fully supported whether in the upright or cruising position or in the more aerodynamic or racing position. A major purpose of the invention is to address the issue of discomfort of prior art saddles which have not evolved from an investigative pelvic anatomical perspective but are largely developments of original saddle designs. The approach thus far has not been to question what the human pelvis requires to be comfortable on a saddle in all positions and cycling conditions but has been mainly focused on weight reduction and aesthetic appearance of the saddle itself. A further purpose of the invention is to address the issue of the loss of control (of the bicycle) through the saddle as the rider transitions between the cruising and the racing positions and breaks or avoids contact with the saddle altogether due to the discomfort factor experienced with most if not all prior art saddles.

BACKGROUND OF THE INVENTION

Current and prior art bicycle saddles are modifications of the first generation designs typically of the velocipede saddle first patented by J. B. Brooks in 1889 (U.S. Pat. No. 401,123). They have been largely unsuccessful attempts to satisfy a racing brief where the rider is in a drop or aero position, or a cruising brief, where the rider is in a substantially upright position. No prior art saddle thus far has managed to achieve an ideal three points of contact configuration to stabilise the pelvis so the lower limbs can do the work of cycling while at the same time providing comfort in the aerodynamic drop position. The issue wherein there is a loss of saddle comfort as the rider transitions between the cruising and the racing positions or avoids contact with the saddle altogether due to the inherent discomfort is particularly important in performance cycling.

The well-known "racing" saddle is universally smaller, narrower, lighter, sharper, and harder. It achieves the goal of weight reduction with little or no attention to comfort or anatomy. Prior art examples which sought to solve the question of discomfort especially when the rider is a long time in the saddle, so to speak, are disclosed in U.S. Pat. No. 7,448,676 (Wyner et. al.), U.S. Pat. No. 9,039,082 (Truglio) and U.S. Pat. No. 8,973,986 (Marceleno). etc.

Few novice cyclists are happy to continue use of any of these examples for long rides. In fact, the saddle itself has been a major reason for people failing to take up cycling as a form of exercise. In tighter cycling circles, riders have been known to bear their weight on their coccyx by placing this part on the saddle nose or to simply stand up and not use the saddle at all. Besides alternating between the cruising and the drop or aero position, or alternately supporting their weight on the left and right sides of the saddle, cyclists have also been known to actually remain in the aero position until pain is replaced by numbness.

Furthermore, while there is some conflict in the research field regarding the incidence of pudendal and perineal nerve dysfunction and genital pathology amongst cyclists, the fact remains that the occurrence of perineal and pudendal discomfort in cyclists is almost universal. The proliferation of sales of bicycling shorts having extra padding for optimal pressure distribution confirms this issue. It is an extreme rarity to spot a serious cyclist doing any decent time or distance on a racing bicycle wearing ordinary shorts.

Prior art "comfort" saddles are bigger, wider and more cushioned than their racing counterparts, but still have a firm or hard nose. While they achieve better comfort in the substantially more upright cruising or standard position, this is at the expense of performance due to adverse aerodynamic factors. Comfort saddles are also far less comfortable when in the aero/drop position thus affecting their actual comfort value. Some comfort saddles with cut outs (e.g. WO 2012/107215) or no noses (e.g. U.S. Pat. No. 8,668,259) or a split nose, remain limited with respect to the ability to offer both comfort and performance and generally fill a niche market only for specific cyclists. One such version (US D767, 909 S, Ideal Saddle Modification), combines both a cut-out and a split nose. This particular saddle design allows for more comfortable upright cruising, but when in the aero or dropped position, the rider still ends up on a hard nose, although with the option of choosing which side of his or her pubis/pudendal region is to take the pressure. Irrespective of having a split nose, when dropping into an aero position, weight is still borne on the inferior pubic rami/pudendal region as in most other saddles. So while improving cruising comfort, there is no improvement when adopting the racing or aero position.

Furthermore, the nose of a saddle is very important in supporting the rider not only when moving in a straight line, but also when shifting from the comfort or cruising position into the aero or racing position. The presence of a nose is especially crucial to controlling the bicycle when cornering or undertaking rapid changes of direction under acceleration or deceleration wherein the rider's position must be kept relatively stable or fixed in relation to the saddle. The absence of a centrally disposed nose as exemplified in some of the abovementioned prior art, results invariably in a loss of full saddle control, wherein overall performance is thus unfortunately compromised.

There is therefore a need for a bicycle saddle able to provide support to all weight bearing pelvic structures in all cycling positions for long periods which is not an unsatisfactory compromise between the traditional cruising and current racing designs.

It is therefore a specific object of the present invention to seek to eliminate or ameliorate the problems of the prior art by providing a bicycle saddle which enables the rider to be comfortably and fully supported whether in the upright or cruising position or the more aerodynamic or racing position. In particular, the invention addresses the issue wherein there is no loss of saddle contact and thus control as the rider transitions between the cruising and the racing positions or avoids contact with the saddle altogether due to the discomfort experienced with inherently design compromised prior art saddles.

STATEMENT OF INVENTION

In one aspect the invention resides in a bicycle saddle comprising:

a seat frame for attaching to a bicycle seat post;

the seat frame providing a structural chassis for a saddle covering including a rearward seat portion extending forwardly to a centrally disposed soft compressible nose;

the seat portion adapted to support a rider's ischial tuberosities (or sit bones) in a comfort or cruising position;

the nose adapted to support the rider's pudendal or pelvic anatomy;

the seat portion further having downwardly sloped lateral flanges disposed either side of the central projecting nose; wherein the sloping flanges provide continuous support to the ischial tuberosities as the rider slides forwardly and downwardly from the cruising to an aerodynamic position; the flanges enabling the rider to bear weight in all cycling positions on the ischial tuberosities, and wherein any concomitant increase in perineal and pudendal regional pressure is substantially dissipated and/or absorbed by compression of the nose thereby facilitating full saddle contact and control at all times Preferably, the seat portion, the nose and the lateral flanges have a substantially planar or flat configuration.

Preferably, the lateral flanges are confluent with the rearward seat portion and include one or more angularly disposed faceted surfaces.

In the alternative, the lateral flanges are confluent with the rearward seat portion and include one or more curved surfaces.

Preferably, the seat frame comprises a lightweight metal, plastic or composite frame or shell having mounting points for attachment to a seat post.

More preferably, the seat frame comprises a sub frame which is attached to and supported by a wire mount specially adapted to be attached to a bracket of the seat post.

In a preferred example, the seat frame can be resiliently deformable under the nose thereby further contributing to the dissipation of perineal and pudendal regional pressure as the rider slides forwardly and downwardly from the cruising to the aerodynamic position.

Preferably, the saddle covering is of a deformable but shape retentive material.

Suitably this material can be of a matrix or sandwich construction including closed cell foam and/or multiple gel layers of varying thicknesses, densities and shock absorbent capability. In a more preferred example, the saddle can have tri-laminar foam and/or gel layer cushioning under the saddle covering in the interest of increased comfort over an already ergonomically efficient design.

Preferably, the saddle is of a one-piece or unitary construction.

In another example, the seat portion, the nose and the lateral flanges is of a separate component or modular construction wherein interchangeable components or modules are able to be assembled together with respect to one another to suit the rider.

In the component or modular version, the seat portion, the nose and the lateral flanges may assembled together in a combination which adjusts or varies the contour, shape or configuration of the saddle to suit the gender, size, and/or personal anatomy of the rider.

BRIEF DESCRIPTION OF THE DRAWINGS

In order for the invention to be better understood reference will now be made to the accompanying drawings, wherein.

DETAILED DESCRIPTION OF THE DRAWINGS

Figure 1:
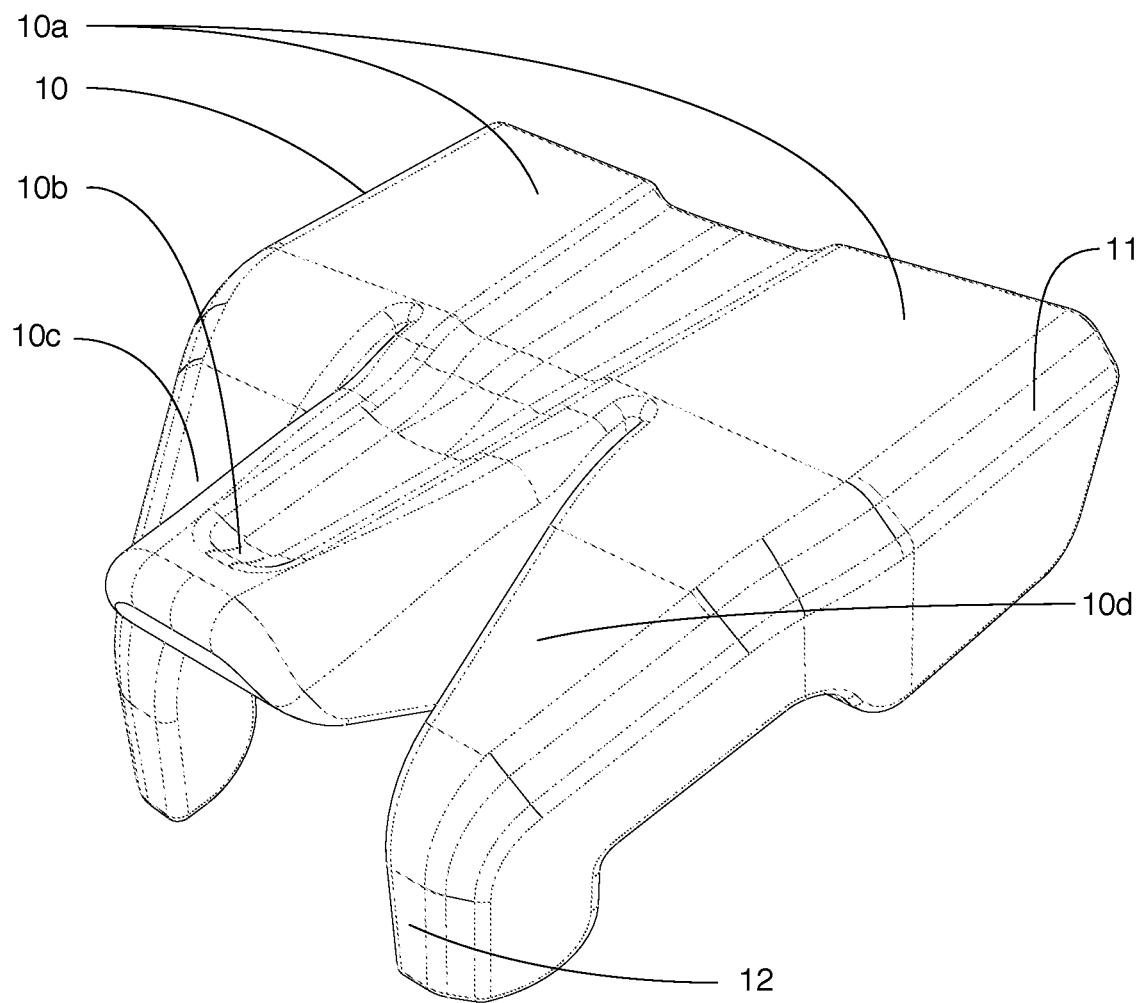
FIG. 1 shows a preferred embodiment of the invention as herein described.

Referring to FIG. 1 there is shown a preferred bicycle saddle according to the invention. The saddle 10 has a seat frame (obscured), preferably comprising a lightweight metal, plastic or composite frame or shell having mounting points for attachment to a seat post (not shown).

The seat frame provides a structural chassis for the saddle covering of a deformable but shape retentive material. As previously discussed, this material can be of a matrix or sandwich construction including closed cell foam and/or multiple gel layers of varying thicknesses, densities and shock absorbent capability. The saddle has a a rearward seat portion 10a which extends forwardly to a centrally located soft and compressible nose 10b.

Figure 2:
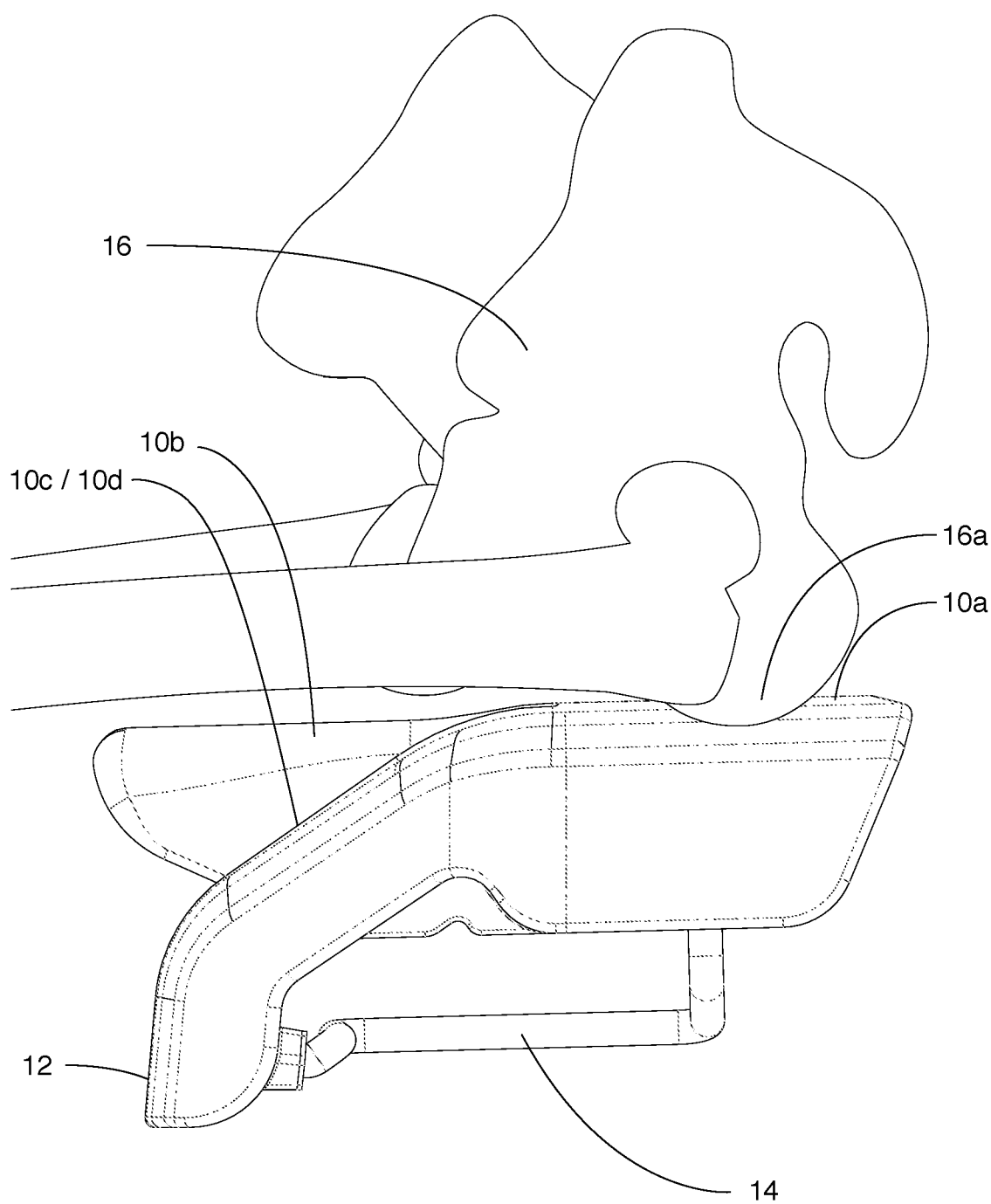
FIGS. 2 and 3 show use of the invention of FIG. 1.

When assuming the more upright comfort or cruising position; a rider's ischial tuberosities (or sit bones) are supported mainly by the seat portion (see FIG. 2).

As a rider (not shown in FIG. 1 but see FIG. 2) slides or moves forwardly and downwardly on the saddle 10, from the cruising position and dropping into an aerodynamic or racing position, downwardly sloping lateral flanges 10c, 10d either side of the central nose 10b continue to provide support to the rider's ischial tuberosities. Any concomitant increase in perineal and pudendal regional pressure due to the change in the rider's position is substantially absorbed by the soft nose 10b.

The lateral flanges 10c, 10d disposed on either side of the nose 10b are confluent with the rearward seat portion 10a and include one or more angularly disposed faceted surfaces 11, 12.

The seat portion, the nose and the lateral flanges in this example have planar or flat configurations. In the alternative, the lateral flanges can include or comprise one or more curved surfaces.

Preferably, the saddle is of a one-piece or unitary construction as shown here, however in another example (see FIG. 4), may be of a separate construction and each component able to be individually selected with respect to one another.

FIG. 2 shows the saddle 12 with seat frame with wire mount 14 wherein the rider 16 (shown in skeletal form) is in an upright comfort or cruising position. The rider's ischial tuberosities (or sit bones) 16a are supported by the rearward seat portion 10a with minimal pressure to the rider's pelvic anatomy as a consequence of the compressibility of soft nose 10b.

Figure 3:
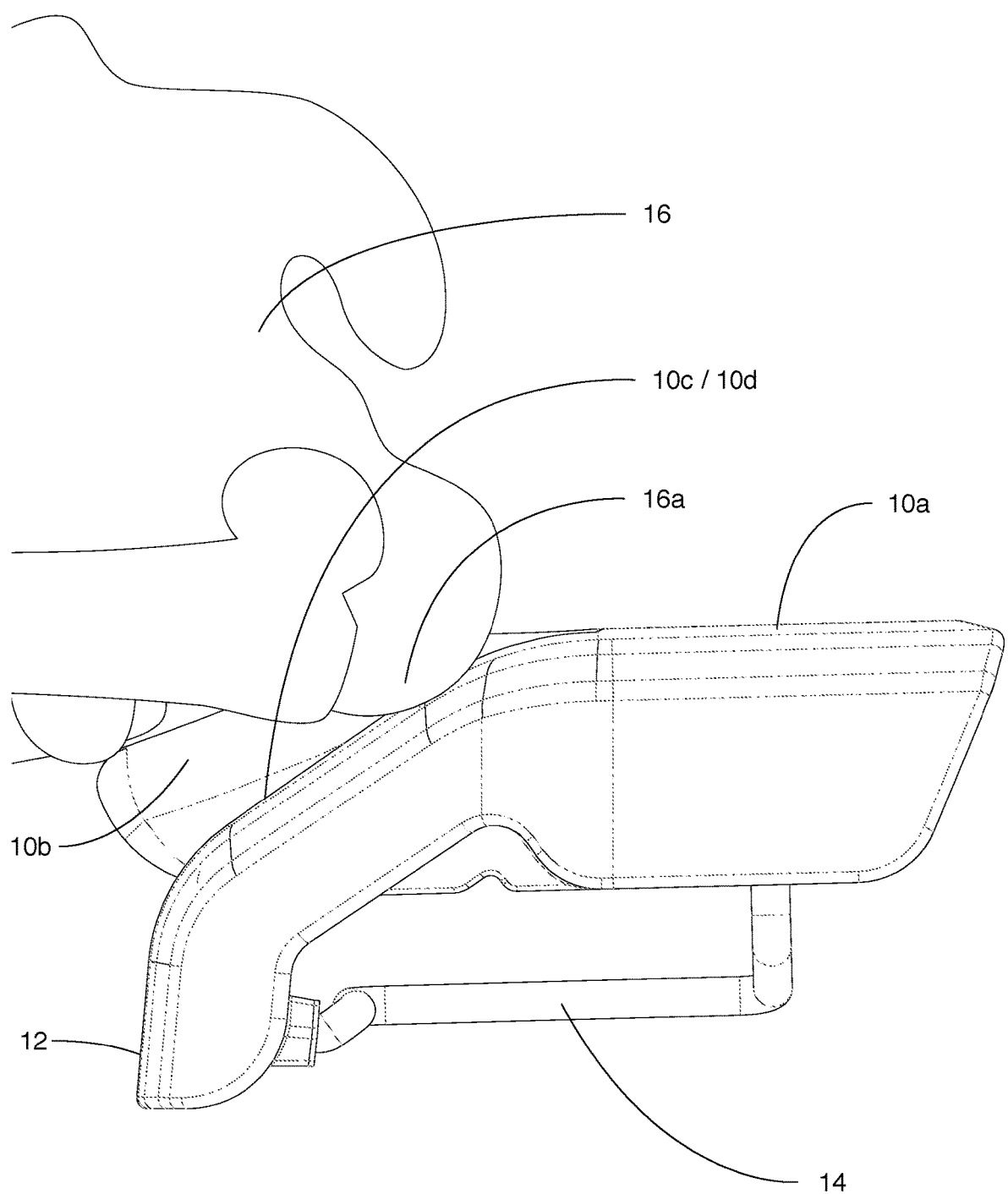

FIG. 3 shows the seat frame with wire mount 14 and saddle 12 (in the same position as FIG. 2) as the rider 16 (shown in skeletal form) shifts or slides off the seat portion 10a, from the cruising position (shown by FIG. 2) into an aerodynamic or drop position, wherein the downwardly sloped flanges 10c, 10d either side of the nose 10b continue to provide support to the rider's ischial tuberosities 16a. Any increase in perineal and pudendal regional pressure is substantially dissipated or absorbed by compression of soft nose 10b. In a preferred embodiment, the seat frame can be resiliently deformable under the nose thereby further contributing to the dissipation of perineal and pudendal regional pressure as the rider slides forwardly and downwardly from the cruising to the aerodynamic position.

The faceted configuration and construction of the saddle surfaces and in particular flanges 10c, 10d enables the rider to maintain support while changing position and to find and establish a sweet spot on the saddle. Control of the bicycle by the rider via continuous saddle contact is therefore enabled to be maintained throughout all changes of position.

Figure 4:
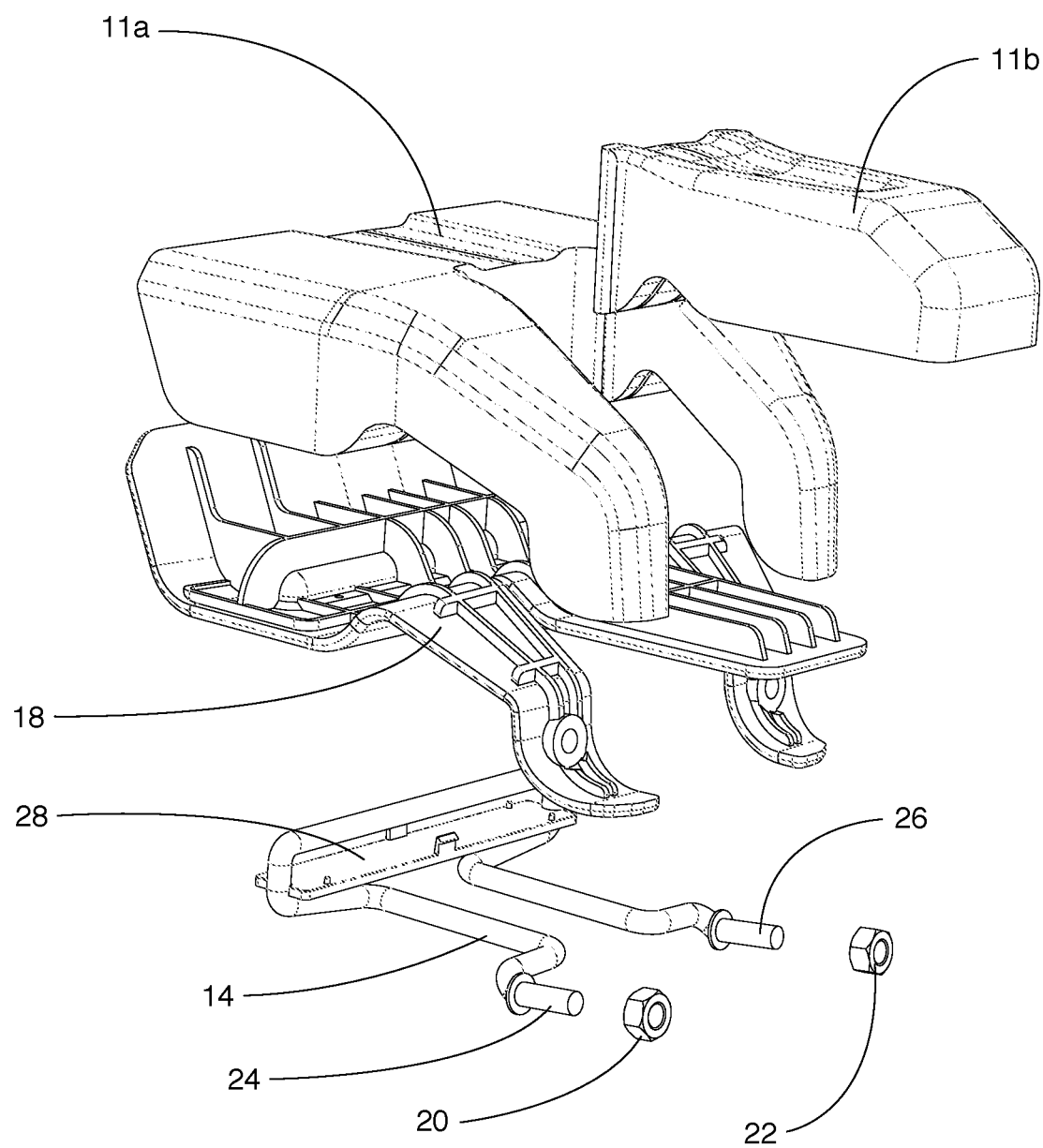
FIG. 4 shows an exploded view of a preferred example of the invention.

FIG. 4 shows an exploded view of a component or modular version of the saddle.

The seat portion (including lateral flanges) 11a and centrally positioned nose 11b are separate interchangeable components or modules assembled together in a combination which facilitates variation to the contour, shape or configuration of the saddle to suit the gender, size, or personal anatomy of the rider (not shown). The modules 11a, 11b are mounted to the sub frame 18. Sub frame 18 is attached by nuts 20, 22 to threaded ends 24, 26 of wire mount 14 and to wire cover plate 28 at rear of wire mount 14. Wire mount 14 is adapted to be attached to a bracket of a seat post (not shown).

As the saddle is of a separate or modular construction, it is envisaged the saddle may be customised to accommodate the type of competition, for example road racing, triathlon or mountain bike trials, or to suit the physical terrain or topography the rider is to encounter.

Some major advantages of the invention over all prior art saddles and which distinguishes the invention may be listed in the following:

Unlike prior art racing saddles, the present invention enables a rider to bear weight in all cycling positions on the ischial tuberosities (or sit bones).

The subject saddle has two main facets, a horizontal one for cruising position cycling and an angled and tapered facet for aero position cycling.

The centralised and unitary soft nose allows for support and stability of the pelvis without generating adverse pressure to the perineal and pudendal (genital) regions that can cause discomfort.

There are no pivoting or rotating parts that can add to pelvic instability whilst cycling.

By using tri-laminar or other equivalent cushioning under the saddle covering, comfort levels can be further and substantially increased over that of the already efficient present ergonomic design.

In the component or modular version, the saddle may be customised to accommodate the gender, size, and personal anatomy of the rider including the type of competition or the physical terrain. The design allows cyclists to establish a sweet spot on the saddle that best fits their particular pelvic anatomy, especially in the aero or drop position.

There is no loss of contact and thus saddle control of the bicycle as the rider shifts between the cruising and the aero positions due to discomfort or pain during long rides.

It will of course be realised that while the foregoing has been given by way of illustrative example of this invention, all such and other modifications and variations thereto as would be apparent to persons skilled in the art are deemed to fall within the broad scope and ambit of this invention as is herein set forth.

In the specification the terms "comprising" and "containing" shall be understood to have a broad meaning similar to the term "including" and will be understood to imply the inclusion of a stated integer or step or group of integers or steps but not the exclusion of any other integer or step or group of integers or steps. This definition also applies to variations on the terms "comprising" and "containing" such as "comprise", "comprises", "contain" and "contains".

The invention claimed is:

1. A bicycle saddle comprising:
a seat frame for attaching a bicycle seat post, the seat frame comprising a rigid wire mount and a sub frame;
a saddle covering fixed to the sub frame; the saddle covering including a portion extending forwardly from a rearward portion to a centrally projecting soft compressible nose;
the seat portion adapted to support a rider's ischial tuberosities (or sit bones) in a comfort or cruising position;
the nose adapted to support the rider's pudendal or pelvic anatomy;
the sub frame comprising a one-piece shell that includes a forwardly projecting flange supporting the centrally projecting nose of the seat portion, the sub frame further having downwardly sloped lateral flanges disposed on each side of and spaced from the centrally projecting nose; wherein
the wire mount is fixedly connected to forward ends of the sloped flanges; the sloped flanges are adapted to provide continuous support to the ischial tuberosities as the rider slides forwardly and downwardly from the cruising to an aerodynamic position; the flanges adapted to enable the rider to bear weight in all cycling positions on the ischial tuberosities such that concomitant increase in perineal and pudendal regional pressure is at least one of substantially dissipated or absorbed by compression of the nose thereby facilitating full saddle contact and control at all times.

2. The bicycle saddle according to claim 1 wherein the saddle is of a one-piece or unitary construction.

3. The bicycle saddle according to claim 1 wherein the saddle is of a separate component or modular construction such that the seat portion and nose are separate and interchangeable components or modules able to be assembled together to suit the rider, type of competition or physical terrain.

4. The bicycle saddle according to claim 1 wherein the seat portion further comprises forward portions supported by the sloped flanges, the nose and the forward portion have a flat or substantially planar configuration.

5. The bicycle saddle according to claim 4 wherein the forward portion are confluent with the rearward portion and include one or more angularly disposed faceted surfaces.

6. The bicycle saddle according to claim 4 wherein the forward portion are confluent with the rearward portion and include one or more curved surfaces.

7. The bicycle saddle according to claim 1 wherein the seat frame comprises a lightweight metal, plastic or composite frame having mounting points for attachment to a seat post.

8. The bicycle saddle according to claim 1 wherein the sub frame is attached to and supported by a wire mount specially adapted to be attached to a bracket of a seat post.

9. The bicycle saddle according to claim 1 wherein the saddle covering is of a deformable but shape retentive material.

10. The bicycle saddle according to claim 1 wherein the saddle covering is of a matrix or sandwich construction including at least one of closed cell foam or multiple gel layers, the saddle covering comprising at least one of a variety of thicknesses, densities and shock absorbent capabilities.

11. The bicycle saddle according to claim 1 wherein cushioning under the saddle covering is at least one of a tri-laminar foam or gel layer construction.

12. The bicycle saddle according to claim 1 wherein the seat frame is resiliently deformable under the nose thereby further contributing to the dissipation of perineal and pudendal regional pressure as the rider slides forwardly and downwardly from the cruising to the aerodynamic position.

* * * * *

UNITED STATES PATENT AND TRADEMARK OFFICE
CERTIFICATE OF CORRECTION

PATENT NO. : 10,556,632 B2
APPLICATION NO. : 16/070296
DATED : February 11, 2020
INVENTOR(S) : Craig Bowker Page 1 of 1

It is certified that error appears in the above-identified patent and that said Letters Patent is hereby corrected as shown below:

In the Claims

In Column 5, Line 60 (approx.), Claim 1, after "attaching" insert -- to --;

In Column 5, Line 63 (approx.), Claim 1, after "a" insert -- seat --.

In Column 6, Line 8 (approx.), Claim 1, delete "portion," and insert -- portion --;

In Column 6, Line 17 (approx.), Claim 1, delete "tuberosities" and insert -- tuberosities, --;

In Column 6, Line 57 (approx.), Claim 11, after "of" delete "a".

Signed and Sealed this
Thirtieth Day of June, 2020

Andrei Iancu
*Director of the United States Patent and Trademark Office*